Patented Aug. 7, 1945

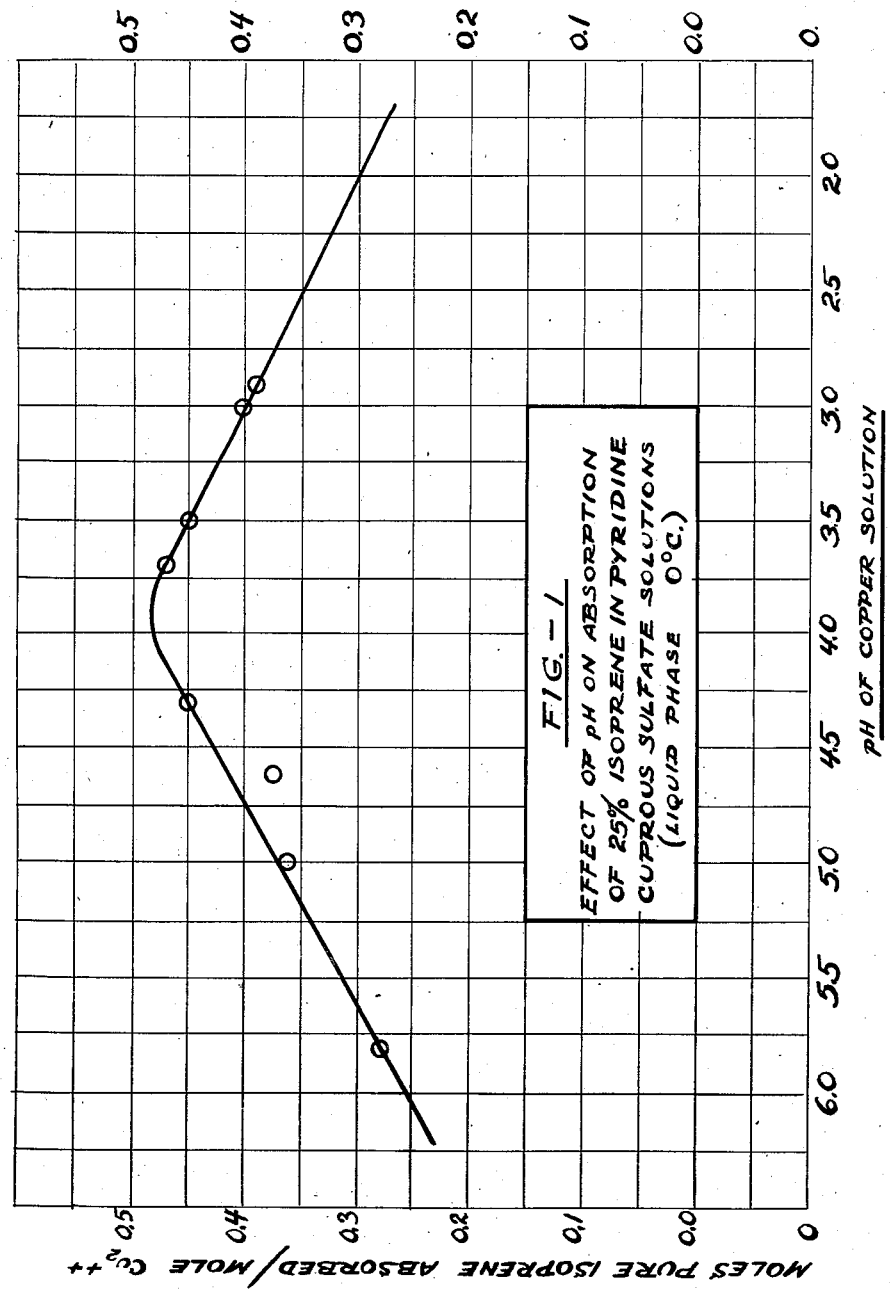

2,381,311

UNITED STATES PATENT OFFICE 2,381,311

METHOD OF CONCENTRATING DIOLEFINS

Richard F. Robey, Roselle, and Miller W. Swaney, Linden, N. J., assignors, by mesne assignments, to Jasco, Incorporated, a corporation of Louisiana Application September 6, 1941, Serial No. 409,778

8 Claims. (Cl. 260—681.5)

This invention relates to the separation and concentration of diolefins from gaseous mixtures containing olefins, diolefins, saturated hydrocarbons, and other gases, and relates particularly to the separation and concentration of diolefins, both gaseous and liquid, from mixtures of unsaturated and saturated hydrocarbons using improved types of cuprous salt solutions.

Rarely are pure hydrocarbons produced in inindustrial processes, particularly in cracking processes. For example, C$_4$ cuts from petroleum refinery operations consist mainly of normal and isobutane, isobutene and the normal butenes-1 and -2, and, in addition, butadiene-1,3. This diolefin, which is a desirable raw material for polymerization reactions, such as in the production of synthetic rubber, possesses a boiling point (—4.5° C.) which lies close to, and between, the boiling points of the other C$_4$ hydrocarbons. Therefore, the separation of pure butadiene from composite C$_4$ cuts by physical manipulations such as distillation, etc., is impractical. The separation, in a pure state, if isoprene and piperylene from composite C$_5$ cuts is equally difficult.

The separation of some of the lower olefins, such as ethylene and propylene, from saturated hydrocarbons has been accomplished by means of selective absorption in cuprous salt solutions (acidic, neutral or basic), an example of this being the separation of ethylene from ethane by contacting with ammoniacal cuprous chloride solutions (in which the olefin is the more soluble), followed by regeneration of high purity ethylene by heating.

In addition to ammoniacal cuprous salt solutions, other amine-copper complexes have found use in separating mono-olefins from paraffins. Among these are the hydroxylated alkylamines (e. g., monoethanolamine, etc.). Ethylene and propylene have been separated from their saturates by means of pyridine solutions of certain copper salts, such as pyridine cuprous acetate solutions (U. S. Serial No. 248,471, filed December 30, 1938, by R. F. Robey, now Patent 2,245,719.

In the further separation of diolefinic hydrocarbons from the mono-olefins, the range of applicability of cuprous salt solutions is much more limited. For instance, the ammoniacal cuprous salt solutions such as cuprous ammonium chloride, acetate, sulfate, etc., are very effective for the separation of butadiene from mixtures with the various butenes. As an illustration, certain ammoniacal cuprous acetate solutions (3–4 normal Cu$^+$) may absorb up to 25–30 volumes of pure butadiene gas. This is likewise true of the ethanolamine-cuprous salt complexes. Yet, when applied to the extraction of isoprene or piperylene from mixtures with pentenes, these solutions are almost completely ineffective. For example, the ammoniacal cuprous acetate solution which absorbs up to 25–30 volumes of pure butadiene gas, dissolves only 1–2 volumes of isoprene gas under similar circumstances.

Of a considerable number of organic amine-copper complexes investigated, only one class proved effective for the extraction of the diolefins higher than butadiene, namely, cuprous salt complexes solubilized with pyridine, a heterocyclic organic base.

An object of this invention is to provide a solution that may be used for the separation and concentration of the diolefins in a substantially pure form from mixtures of olefins, diolefins and other compounds.

According to this invention it was found that a cuprous salt solution in which pyridine was used as a solubilizer for the cuprous salt could be used to separate and concentrate substantially pure diolefins. Although pyridine-cuprous acetate, lactate, etc., solutions are very effective agents for the selective extractions of isoprene and piperylene from the penetenes, the outstanding combination of this class is the pyridine-cuprous sulfate complex which possesses not only a high absorption capacity for C$_5$ diolefins but, as well, exhibits a very high selectivity for isoprene and piperylene. As the later examples illustrate, when a pyridine-cuprous sulfate solution of only 2.0 normal copper content is contacted with a C$_5$ blend containing only 20% of isoprene, the copper solution on subsequent desorption yields an isoprene product of 98% purity. Such a solution dissolves 15–16 volumes (measured as S. T. P.) of pure isoprene gas or 13–14 volumes of pure piperylene. Whereas the cuprous ions engaged in the cuprous salt-ammonia complexes do not possess sufficient activity to combine with diolefins higher than butadiene, the copper in the pyridine complexes is in an extremely active state and enters into practically 100% combination with diolefins.

Not only is pyridine itself a very efficient amine for solubilizing cuprous salts in producing highly active amine-copper complexes, but also other bases of the pyridine series are of importance. For example, the picolines (alpha-, beta-, and gamma-methyl-pyridines) form very stable and desirable complexes with cuprous salts.

Although several of the pyridine-cuprous sulfate complexes possess definite merit as extractants for the C₅ diolefins, the optimum diolefin absorbing solutions as proposed by the present invention are those of the pyridine cuprous sulfate class of about 2.0 normal cuprous ion content, and possessing pH values in the range of 4 as illustrated by Example IV.

The pyridine cuprous sulfate solutions are prepared by adding cuprous oxide to aqueous solutions of pyridine and pyridine sulfate, in the absence of air. The completely cuprous solutions are of clear light-amber color, which turns to bright green when a small proportion of the total copper present becomes oxidized to the cupric state. An optimum solution is prepared by mixing 127 parts by weight of pyridine, 35 parts of cuprous oxide ($Cu_2O$), 100 parts of water and 48 parts of 94% $H_2SO_4$. A clear solution results almost immediately which is 2.0 normal in cuprous content and of 4.0 pH.

The pyridine-cuprous acetate, lactate, and sulfate solutions were found to possess the unexpected and extremely important advantage of being stable in contact with available metals of construction in spite of the fact that some of these solutions are quite acidic in nature. For example, pyridine-cuprous sulfate solutions of 4.0 pH or lower are completely stable in contact with copper or stainless steel at 90–100° C. for indefinite periods.

The following examples serve to illustrate the present invention:

EXAMPLE I (a) An ammoniacal cuprous acetate solution of 3.4 normal cuprous content was prepared by dissolving cuprous oxide in an aqueous solution, 6 normal in ammonium hydroxide and 6 normal in ammonium acetate. When this solution was contacted with 20% butadiene (in butenes) at 0° C., 16–17 volumes of butadiene gas of 92% purity were dissolved per volume of copper solution. When this ammoniacal cuprous acetate solution was agitated at −10° C. with pure liquid butadiene, it was found to dissolve nearly 30 volumes of $C_4H_6$ per volume of solution. This signifies that about 65–70% of the total cuprous ions present had combined in absorbing butadiene.

(b) When the ammoniacal copper solution (described in part a) was saturated at −5° C. with a C₅ blend comprising 25% isoprene and 75% trimethylethylene (2-methylbutene-2) and the phases separated, the copper solution, upon desorption, yielded only 1.6 volumes of isoprene of only 78% purity. In this instance, the cuprous ions in this complex solution were of such low activity that practically none had combined with isoprene. The small amount of isoprene actually dissolved would account for only 3% utilization of Cu⁺, excluding physically dissolved isoprene.

When this extraction was repated using a 25% piperylene blend an even smaller amount of diolefin was dissolved which corresponded to only 2% Cu⁺ utilization.

EXAMPLE II (a) An aqueous pyridine-cuprous acetate solution of 1.8 normal copper content was prepared by dissolving cuprous oxide in a pyridine-acetate solution until saturated with copper. When the solution thus prepared was brought to equilibrium with pure gaseous butadiene at +10° C., 22.5 volumes of butadiene were dissolved by each volume of copper solution, denoting substantially a 100% utilization of Cu⁺ in forming the $Cu_2^{++}$-butadiene complex.

(b) When a pyridine-cuprous lactate solution of 1.8 normal Cu⁺ content was contacted at 0° C. with a low purity isoprene blend (25% in trimethyly-ethylene), it was found to dissolve more than 7 volumes of isoprene gas per volume of copper solution used.

EXAMPLE III (a) A pyridine-cuprous sulfate solution of 2.0 normal Cu⁺ content, and prepared as described above was contacted at +10° C. with pure gaseous butadiene whereupon 21 volumes of butadiene were dissolved per volume of solution employed. This represents a utilization of substantially 100% of the total cuprous ions in this highly active complex in uniting with butadiene.

When this solution was further contacted with low purity butadiene under similar circumstances, this diolefin was concentrated from 20% to over 92% in a single extraction step.

(b) Even though an ammoniacal copper complex solution almost twice as concentrated in cuprous ions failed to appreciably dissolve isoprene or piperylene, as illustrated in Example I, the 2.0 normal pyridine-cuprous sulfate solution (described in part a), when contacted with pure liquid isoprene at 0° C., dissolved 16–17 volumes of this C₅ diolefin per volume of solution, representing a Cu⁺ utilization of about 75%. In a separate test the absorption efficiency for piperylene was found to be almost as high.

(c) When this pyridine-cuprous sulfate solution was contacted at 0° C. with low purity isoprene (25% in trimethylethylene) and subsequently desorbed it yielded over 11 volumes of gaseous isoprene of 92–94% purity and suitable for use directly in many reactions. When the saturated pyridine-cuprous sulfate solution was desorbed in two stages, so as to flash off traces of pentenes in the first step, an isoprene product of 98% purity was produced.

EXAMPLE IV

A series of eight pyridine-cuprous sulfate solutions of different pH values ranging from 2.9 to 5.8 were prepared and employed in extracting blends of 25% isoprene-75% trimethylethylene under controlled conditions. The results, which are tabulated below, show marked dependence of diolefin solubility and selectivity on solution pH. The optimum pyridine-cuprous sulfate solutions, as embodied by the present invention are those of pH approximately 4.0, in which region isoprene solubility is optimum and pentene solubility is very low. These data are represented graphically in Figure 1.

TABLE I

*Effect of solution pH on solubility of 25% isoprene-75% trimethylethylene in pyridine cuprous sulfate solutions (liquid phase extractions, 0° C.)*

| Solution pH | Cu⁺ normality | Vols. C₅ absorbed per vol. Cu soln. | Percent isoprene in product | Vols. pure $C_5H_8$/vol. Cu soln. (S. T. P.) | Mols $C_5H_8$/ mol $Cu_2^{++}$ |
|---|---|---|---|---|---|
| 5.8 | 2.4 | 9.4 | 89 | 7.6 | 0.28 |
| 5.0 | 2.9 | 17.0 | 75.5 | 11.7 | 0.36 |
| 4.6 | 2.4 | 13.2 | 82.5 | 9.9 | 0.37 |
| 4.3 | 2.5 | 15.4 | 90.5 | 12.7 | 0.45 |
| 3.7 | 2.2 | 14.2 | 89 | 11.5 | 0.47 |
| 3.5 | 2.5 | 14.7 | 93.5 | 12.5 | 0.45 |
| 3.0 | 1.7 | 8.7 | 95.5 | 7.5 | 0.40 |
| 2.9 | 1.8 | 9.0 | 95.0 | 7.8 | 0.39 |

The above examples illustrate the merits of the present invention and the excellent superiority of the pyridine-cuprous salt complexes as extractants for diolefins, both gaseous and liquid. Although all the examples presented herein involved regeneration of diolefins from copper solutions by means of heat, this may also be accomplished by subjecting the copper solution to reduced pressures, or by contacting it with a hydrocarbon boiling above or below the diolefin being concentrated, or by stripping with an inert gas. These examples are not intended as a limitation but for illustration only.

We claim:

1. A process for the separation of a diolefin from a hydrocarbon mixture by means of a selective extraction with a solution comprising a cuprous salt dissolved in a pyridine base.

2. A process for the production of a diolefin of high purity which comprises contacting a hydrocarbon mixture containing a diolefin, mono-olefins, and saturates with a solution of a cuprous salt dissolved in a pyridine base, separating the copper salt phase and heating to regenerate the desired diolefin of high purity.

3. A process for the production of diolefins of high purity which comprises contacting hydrocarbon mixtures containing the desired diolefins with an aqueous solution of a cuprous salt dissolved in pyridine, separating the pyridine-cuprous salt solution and heating to regenerate the diolefins of high purity.

4. A process for the production of diolefins of high purity which comprises contacting hydrocarbon mixtures containing these diolefins with pyridine-cuprous salt solutions of about 2.0 normal cuprous ion content at a temperature of 0° C., separating said cuprous salt solution and heating to about 70°–80° C. to regenerate the diolefins of high purity.

5. A process according to claim 4 in which the cuprous salt is the acetate.

6. A process for the production of diolefins of high purity which comprises contacting mixtures of the diolefins with other hydrocarbons with aqueous pyridine-cuprous sulfate solutions at temperatures of about −10° to +10° C., separating the solution therefrom and heating to about 70°–80° C. to regenerate the desired diolefins of high purity.

7. A process for the production of isoprene of high purity which comprises contacting mixtures of isoprene and pentenes and pentanes at about 0° C. with an aqueous pyridine-cuprous sulfate solution of about 2.0 normal cuprous content and of about 4.0 pH, separating the cuprous solution therefrom and heating to regenerate the desired isoprene of 90–100% purity.

8. A process according to claim 7 in which the desired diolefins consist of a mixture of isoprene and piperylene.

RICHARD F. ROBEY.
MILLER W. SWANEY.